US008514765B1

(12) United States Patent
Senarath et al.

(10) Patent No.: US 8,514,765 B1
(45) Date of Patent: Aug. 20, 2013

(54) DYNAMIC ZONING CHANGES IN MULTI-HOP RELAYING SYSTEMS

(75) Inventors: Nimal Gamini Senarath, Nepean (CA); Israfil Bahceci, Nepean (CA); Hang Zhang, Nepean (CA); Derek Yu, Kanata (CA); Peiying Zhu, Kanata (CA); Wen Tong, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 831 days.

(21) Appl. No.: 12/463,529

(22) Filed: May 11, 2009

Related U.S. Application Data

(60) Provisional application No. 61/052,005, filed on May 9, 2008.

(51) Int. Cl.
*H04B 7/14* (2006.01)

(52) U.S. Cl.
USPC .......................................................... 370/315

(58) Field of Classification Search
USPC ............. 370/310, 315, 328, 329, 331; 455/7, 455/403, 422.1, 436, 442
See application file for complete search history.

(56) References Cited

U.S. PATENT DOCUMENTS

| 7,848,276 | B2 * | 12/2010 | Lee et al. ....................... 370/315 |
| 8,009,630 | B2 * | 8/2011 | Boariu et al. .................. 370/331 |
| 2008/0101275 | A1 * | 5/2008 | Kang et al. .................... 370/315 |
| 2008/0108355 | A1 * | 5/2008 | Oleszcsuk ...................... 455/442 |
| 2008/0165881 | A1 * | 7/2008 | Tao et al. ....................... 375/267 |
| 2008/0227386 | A1 * | 9/2008 | Dayal et al. ....................... 455/7 |
| 2008/0285500 | A1 * | 11/2008 | Zhang et al. .................. 370/315 |
| 2009/0252079 | A1 * | 10/2009 | Zhang et al. .................. 370/315 |
| 2009/0303918 | A1 * | 12/2009 | Ma et al. ....................... 370/315 |

* cited by examiner

*Primary Examiner* — Chi Pham
*Assistant Examiner* — Robert Lopata
(74) *Attorney, Agent, or Firm* — Fish & Richardson P.C.

(57) ABSTRACT

A method dynamically changes a relay zone offset in a wireless communication system. The wireless communication system includes a base station, at least one relay station, and at least one mobile station. Each relay station is located a hop distance from the base station. A notification of a change in relay zone offset is transmitted to a relay station. Implementation of the change in relay zone offset is delayed for a predetermined amount of frames. Relay zone information is transmitted using the changed relay zone offset.

18 Claims, 6 Drawing Sheets

DYNAMIC ZONING CHANGES IN MULTI-HOP RELAYING SYSTEMS

CROSS-REFERENCE TO RELATED APPLICATION

This application is related to and claims priority to U.S. Provisional Patent Application No. 61/052,005, entitled "DYNAMIC ZONING CHANGES IN MULTI-HOP RELAYING SYSTEMS," filed May 9, 2008, the entire contents of which is incorporated herein by reference.

STATEMENT REGARDING FEDERALLY SPONSORED RESEARCH OR DEVELOPMENT n/a

FIELD OF THE INVENTION

The present invention relates generally to wireless communication systems and more specifically to a method and system for dynamic zoning changes in multi-hop wireless communication relaying systems.

BACKGROUND OF THE INVENTION

In wireless communication systems which use relay stations ("RS"), base station ("BS") to RS transmissions, i.e. Relay-Link, and BS or RS to mobile station ("MS") transmissions are separated in time to avoid interference and provide effective transmissions. The separate zones are called R-Zones. This zone configuration is communicated to the RSs by the BS.

Currently, relay communication systems use a relay location field in the Relay Frame Control Header ("R-FCH") to indicate the R-Zone of the next frame to the RS. The relay location field contains an offset value in number of symbols.

When traffic load among RSs in a wireless communication system experiences rapid variations, such as a communication system operating as defined by the Institute of Electrical and Electronics Engineers ("IEEE") standard 802.16j, relay zone locations and corresponding sizes need to be updated frequently and dynamically, resulting in significant delay and significant overhead. For a two-hop system, a change in the relay zone can be done dynamically by changing the symbol offset. In other words, the configuration can be changed starting from the next frame without any ambiguity and without impacting the operation.

However, in the case of multi-hop transmission, when the scheduling is done in distributed manner, i.e. the relays are free to assign transmissions in specified zones, a change informed by the BS cannot be propagated down to the next hop relays without misalignment of the zone configurations. For current 802.16j solutions, R-Zone location indicates the offset relative to the frame start preamble for the first Orthogonal Frequency Division Multiplexing ("OFDM") symbol of the R-FCH or R-MAP allocation. Whenever the frame configuration is updated, the subordinate RSs do not have sufficient time to update their scheduling before and after the new configuration is effective.

For example, assume an R-zone location for a current frame is indicates an offset of 10 for the first OFDM symbol and the first RS begins its UL-MAP at an offset of 15. If the R-zone location is changed in the FCH to indicate an offset of 18, a conflict occurs between the new R-zone region and the UL allocation region because the RS does not have time to implement the change. In other words, the BS wants to transmit to the RS in a region where the RS had planned to receive data from an MS.

One prior solution provides an action frame number field in the FCH. The action frame number indicates in which upcoming frame the R-zone location change is to be implemented. Providing an action frame number requires an additional field in the FCH and introduces additional overhead. However, in the 802.16j system, as proposed, there is not enough bit space in the FCH message to insert an additional field.

Therefore, what is needed is a system and method for dynamic zoning changes in a multi-hop relaying system that allows sufficient time for multi-hop relays to implement without adding additional overhead.

SUMMARY OF THE INVENTION

The present invention advantageously provides a method and system for dynamically changing the relay zone ("R-zone") in a multi-hop relay communication system. Generally, a base station may dynamically change the relay zone by sending a new R-zone offset in a relay frame control header. The change is not implemented by the base station or any relay station in the path for a predetermined amount of frames. The delay is based, in part, on the maximum amount of hops in the path. The base station and all relay stations in the path apply the new R-zone offset simultaneously.

In accordance with one aspect of the present invention, a method is provided for dynamically changing a relay zone offset in a wireless communication system. The wireless communication system includes a base station, at least one relay station, and at least one mobile station. Each relay station is located a hop distance from the base station. A notification of a change in relay zone offset is transmitted to a relay station. Implementation of the change in relay zone offset is delayed for a predetermined amount of frames. Relay zone information is transmitted using the changed relay zone offset.

In accordance with another aspect of the present invention, a method is provided for dynamically changing a relay zone offset in a wireless communication system. The wireless communication system includes a base station, at least one relay station, and at least one mobile station. Each relay station is located a hop distance from the base station. A frame including a first relay zone offset is received. If the first relay zone offset is different from a second relay zone offset received in a previous frame, implementation of the first relay zone offset is delayed for a predetermined amount of frames. Downlink information is received using the first relay zone offset.

In accordance with yet another aspect of the present invention, a wireless communication system is provided for communication with at least one mobile station. The wireless communication system includes at least one relay station and at least one base station. The base station is communicatively coupled to the at least one mobile station through the at least one relay station. The at least one relay station is located a hop distance from the base station. The base station is operable to transmit a notification of a change in relay zone offset to the at least one relay station, delay implementation of the change in relay zone offset for a first predetermined amount of frames, and transmit relay zone information using the changed relay zone offset.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
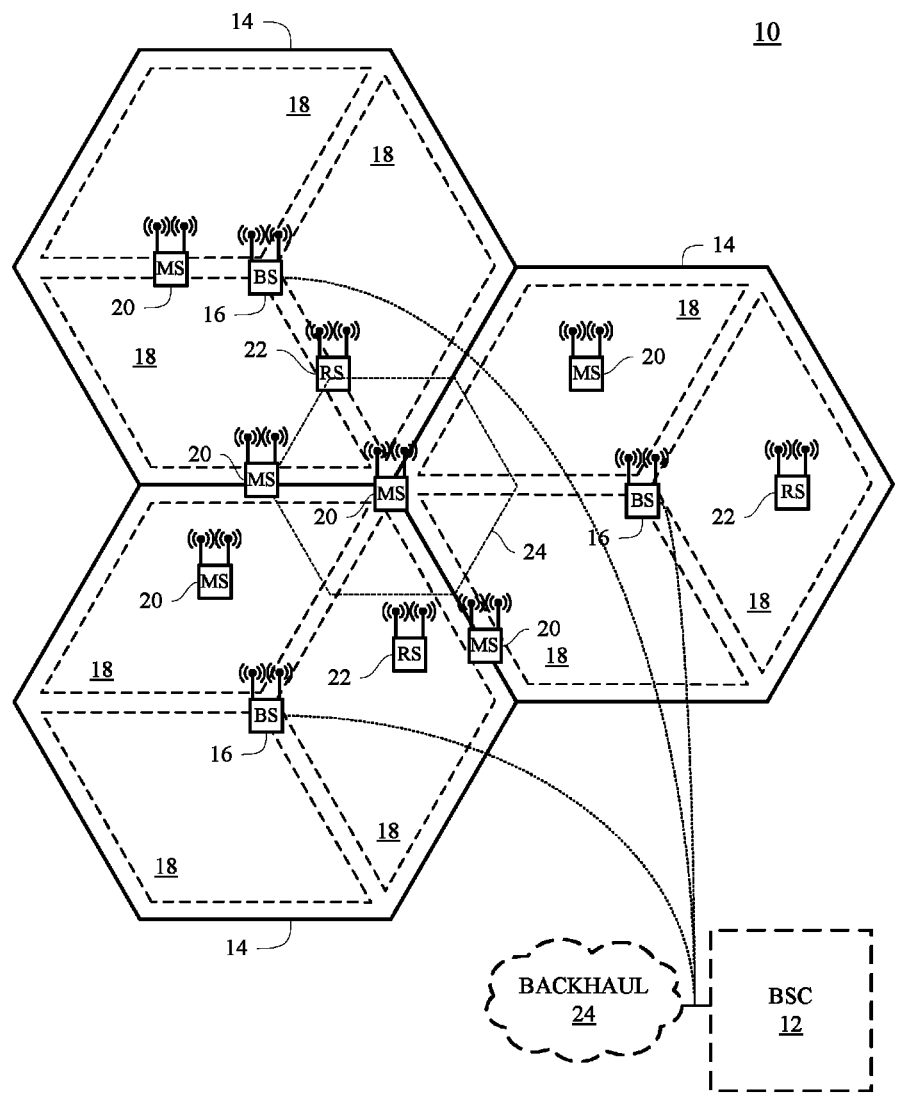
FIG. 1 is a block diagram of an exemplary cellular communication system constructed in accordance with the principles of the present invention.

Before describing in detail exemplary embodiments that are in accordance with the present invention, it is noted that the embodiments reside primarily in combinations of apparatus components and processing steps related to dynamically changing relay zones in a wireless communication system. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

One embodiment of the present invention advantageously enables dynamic frame configuration updates, thereby allowing specific relay zone designs for best resource usage and efficient use of resources depending on the dynamic traffic load.

Referring now to the drawing figures in which like reference designators refer to like elements, there is shown in FIG. 1, an exemplary communication system 10 is provided in accordance with the principles of the present invention. Communication system 10 includes a base station controller ("BSC") 12 which controls wireless communications within multiple cells 14, which cells are served by corresponding base stations ("BS") 16. In some configurations, each cell is further divided into multiple sectors 18 or zones (not shown). In general, each base station 16 facilitates wireless communications using orthogonal frequency division multiplexing ("OFDM") with mobile and/or wireless terminals 20, which are within the cell 14 associated with the corresponding base station 16. The movement of the mobile terminals 20 in relation to the base stations 16 results in significant fluctuation in channel conditions. As illustrated, the base stations 16 and mobile terminals 20 may include multiple antennas to provide spatial diversity for communications. In some configurations, relay stations 22 may assist in communications between base stations 16 and wireless terminals 20. Wireless terminals 20 can be handed off from any cell 14, sector 18, zone (not shown), base station 16 or relay 22 to another cell 14, sector 18, zone (not shown), base station 16 or relay 22. In some configurations, base stations 16 communicate with each other and with another network (such as a core network or the internet, both not shown) over a backhaul network 24. In some configurations, a base station controller 12 is not needed.

Figure 2:
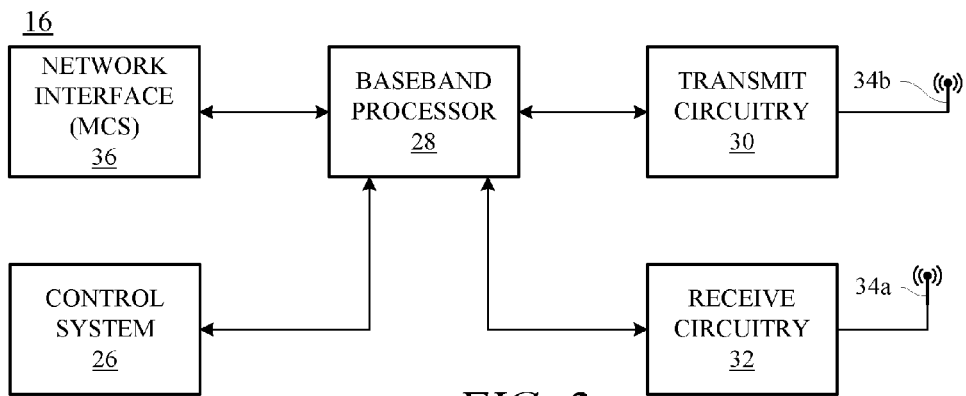
FIG. 2 is a block diagram of an exemplary base station constructed in accordance with the principles of the present invention.

With reference to FIG. 2, an example of a base station 16 is illustrated. The base station 16 generally includes a control system 26, a baseband processor 28, transmit circuitry 30, receive circuitry 32, multiple antennas 34a, 34b and a network interface 36. Control system 26 may be a central processing unit ("CPU") or other controller or microprocessor. The receive circuitry 32 receives radio frequency signals bearing information through a receive antenna 34a from one or more remote transmitters provided by mobile terminals 20 (illustrated in FIG. 3) and relay stations 22 (illustrated in FIG. 4). Although shown in FIG. 2 with only one receive antenna 34a and one transmit antenna 34b, the number of receive antennas 34a and transmit antennas 34b can be more than one. Also, the transmit antennas 34b can be the same antennas 34a used for receiving. A low noise amplifier and a filter (not shown) may cooperate to amplify and remove broadband interference from the signal for processing. Down-conversion and digitization circuitry (not shown) down-convert the filtered, received signal to an intermediate or baseband frequency signal, which is digitized into one or more digital streams.

The baseband processor 28 processes the digitized received signal to extract the information or data bits conveyed in the received signal. This processing typically comprises demodulation, decoding, and error correction operations. As such, the baseband processor 28 is generally implemented in one or more digital signal processors ("DSPs") and/or application-specific integrated circuits ("ASICs"). The received information is sent across a wireless network via the network interface 36 or transmitted to another mobile terminal 20 serviced by the base station 16, either directly or with the assistance of a relay 22.

On the transmit side, the baseband processor 28 receives digitized data, which may represent voice, data, or control information, from the network interface 36 under the control of control system 26, and encodes the data for transmission. The encoded data is output to the transmit circuitry 30, where it is modulated by one or more carrier signals having a desired transmit frequency or frequencies. A power amplifier (not shown) amplifies the modulated carrier signals to a level appropriate for transmission, and delivers the modulated carrier signals to the transmit antennas 34b through a matching network (not shown). Modulation and processing details are described in greater detail below.

Figure 3:
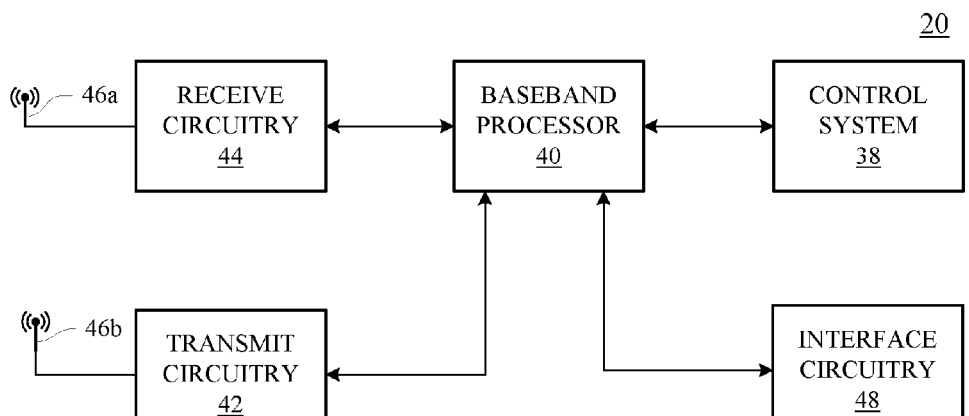
FIG. 3 is a block diagram of an exemplary wireless terminal constructed in accordance with the principles of the present invention.

With reference to FIG. 3, an example of a mobile terminal 20 is illustrated. Similarly to the base station 16, the mobile terminal 20 includes a control system 38, a baseband processor 40, transmit circuitry 42, receive circuitry 44, multiple antennas 46a, 46b and user interface circuitry 48. Control system 38 may be a CPU or other controller or microprocessor. The receive circuitry 44 receives radio frequency signals bearing information through a receive antenna 46a from one or more base stations 16 and relays 22. Although shown in FIG. 3 with only one receive antenna 46a and one transmit antenna 46b, the number of receive antennas 46a and transmit antennas 46b can be more than one. Also, the transmit antennas 46b can be the same antennas 46a used for receiving. A low noise amplifier and a filter (not shown) may cooperate to amplify and remove broadband interference from the signal for processing. Down-conversion and digitization circuitry (not shown) down-convert the filtered, received signal to an intermediate or baseband frequency signal, which is digitized into one or more digital streams.

The baseband processor 40 processes the digitized received signal to extract the information or data bits conveyed in the received signal. This processing typically comprises demodulation, decoding, and error correction operations. The baseband processor 40 is generally implemented in one or more DSPs and/or ASICs.

For transmission, the baseband processor 40 receives digitized data, which may represent voice, video, data, or control information, from the control system 38, which it encodes for transmission. The encoded data is output to the transmit circuitry 42, where it is used by a modulator to modulate one or more carrier signals at a desired transmit frequency or frequencies. A power amplifier (not shown) amplifies the modulated carrier signals to a level appropriate for transmission, and delivers the modulated carrier signal to the transmit antennas 46b through a matching network (not shown). Various modulation and processing techniques available to those skilled in the art are used for signal transmission between the mobile terminal and the base station, either directly or via the relay station.

In OFDM modulation, the transmission band is divided into multiple, orthogonal carrier waves. Each carrier wave is modulated according to the digital data to be transmitted. Because OFDM divides the transmission band into multiple carriers, the bandwidth per carrier decreases and the modulation time per carrier increases. Since the multiple carriers are transmitted in parallel, the transmission rate for the digital data, or symbols, on any given carrier is lower than when a single carrier is used.

OFDM modulation utilizes the performance of an Inverse Fast Fourier Transform ("IFFT") on the information to be transmitted. For demodulation, the performance of a Fast Fourier Transform ("FFT") on the received signal recovers the transmitted information. In practice, the IFFT and FFT are provided by digital signal processing carrying out an Inverse Discrete Fourier Transform ("IDFT") and Discrete Fourier Transform ("DFT"), respectively. Accordingly, the characterizing feature of OFDM modulation is that orthogonal carrier waves are generated for multiple bands within a transmission channel. The modulated signals are digital signals having a relatively low transmission rate and capable of staying within their respective bands. The individual carrier waves are not modulated directly by the digital signals. Instead, all carrier waves are modulated at once by IFFT processing.

In operation, OFDM is preferably used for at least downlink transmission from the base stations 16 to the mobile terminals 20. Each base station 16 is equipped with "n" transmit antennas 34b (n>=1), and each mobile terminal 20 is equipped with "m" receive antennas 46a (m>=1). Notably, the respective antennas can be used for reception and transmission using appropriate duplexers or switches and are so labeled only for clarity.

When relay stations 22 are used, OFDM is preferably used for downlink transmission from the base stations 16 to the relays 22 and from relay stations 22 to the mobile terminals 20.

Figure 4:
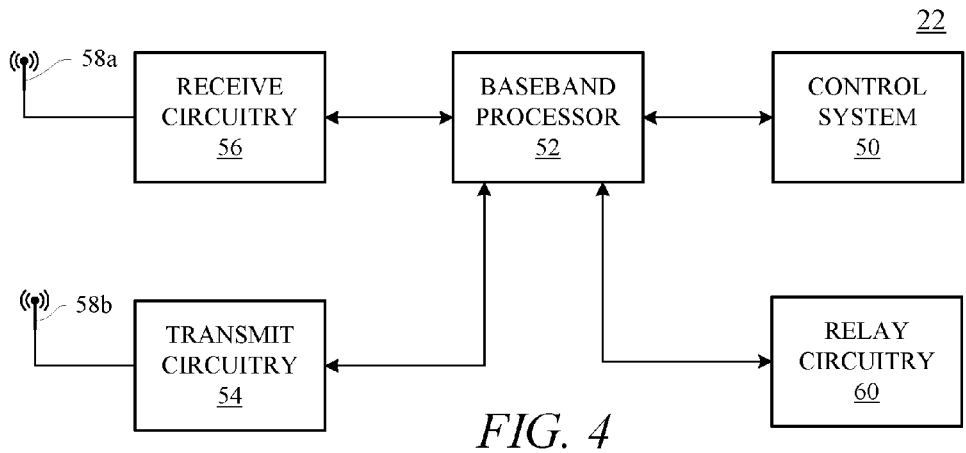
FIG. 4 is a block diagram of an exemplary relay station constructed in accordance with the principles of the present invention.

With reference to FIG. 4, an example of a relay station 22 is illustrated. Similar to the base station 16, and the mobile terminal 20, the relay station 22 includes a control system 50, a baseband processor 52, transmit circuitry 54, receive circuitry 56, multiple antennas 58a, 58b and relay circuitry 60. Control system 50 may be a CPU or other controller or microprocessor. The relay circuitry 60 enables the relay 22 to assist in communications between a base station 16 and mobile terminals 20. The receive circuitry 56 receives radio frequency signals bearing information through a receive antenna 58a from one or more base stations 16 and mobile terminals 20. Although shown in FIG. 4 with only one receive antenna 58a and one transmit antenna 58b, the number of receive antennas 58a and transmit antennas 58b can be more than one. Also, the transmit antennas 58b can be the same antennas 58a used for receiving. A low noise amplifier and a filter (not shown) may cooperate to amplify and remove broadband interference from the signal for processing. Down-conversion and digitization circuitry (not shown) down-convert the filtered, received signal to an intermediate or baseband frequency signal, which is digitized into one or more digital streams.

The baseband processor 52 processes the digitized received signal to extract the information or data bits conveyed in the received signal. This processing typically comprises demodulation, decoding, and error correction operations. The baseband processor 52 is generally implemented in one or more DSPs and/or ASICs.

For transmission, the baseband processor 52 receives digitized data, which may represent voice, video, data, or control information, from the control system 50, which it encodes for transmission. The encoded data is output to the transmit circuitry 54, where it is used by a modulator to modulate one or more carrier signals that is at a desired transmit frequency or frequencies. A power amplifier (not shown) will amplify the modulated carrier signals to a level appropriate for transmission, and deliver the modulated carrier signal to the transmit antenna 58b through a matching network (not shown). Various modulation and processing techniques available to those skilled in the art are used for signal transmission between the mobile terminal 20 and the base station 16, either directly or indirectly via a relay station 22, as described above.

Figure 5:
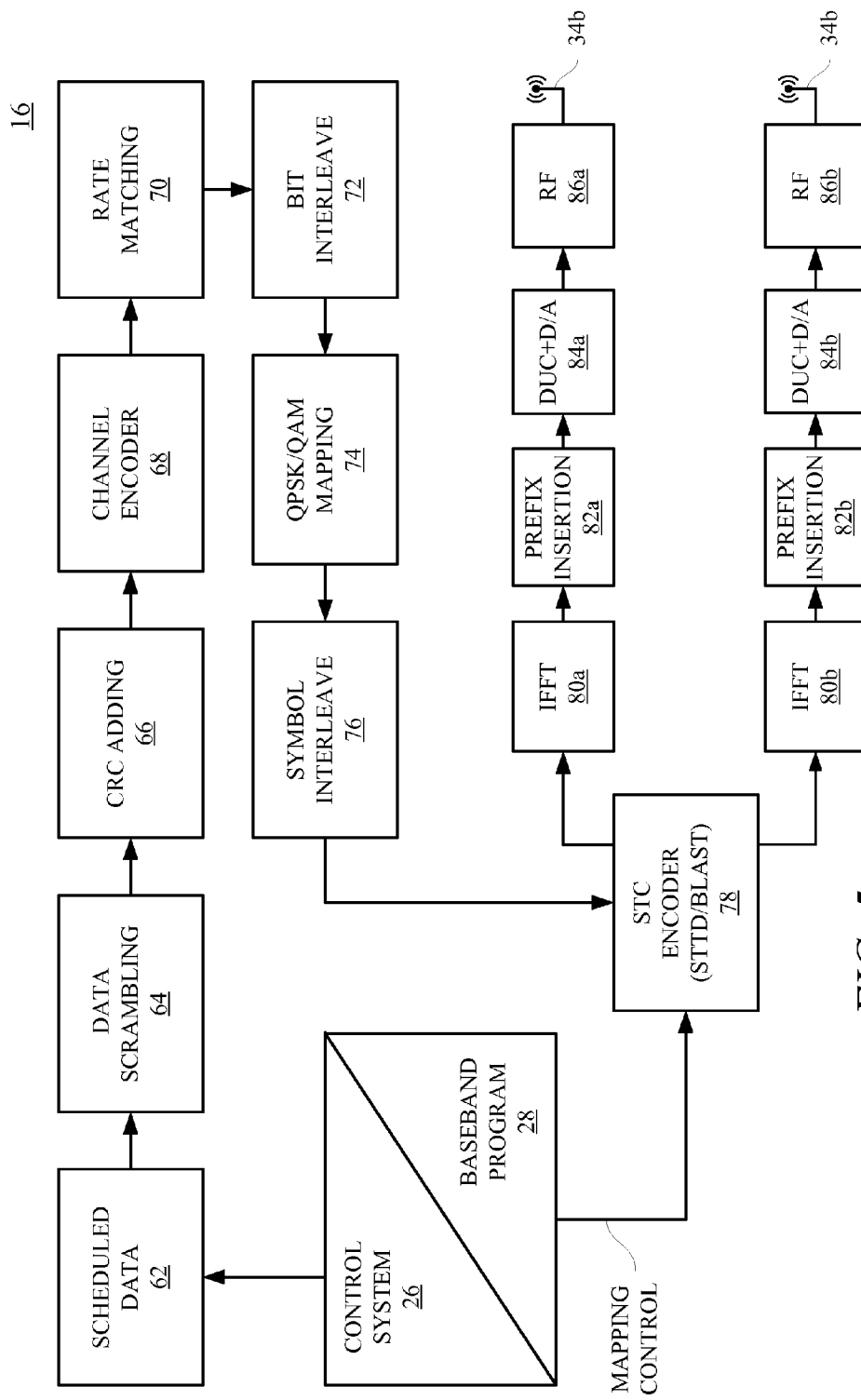
FIG. 5 is a block diagram of a logical breakdown of an exemplary OFDM transmitter architecture constructed in accordance with the principles of the present invention.

With reference to FIG. 5, a logical OFDM transmission architecture is provided. Initially, the base station controller 12 (See FIG. 1) sends data destined for transmission to various mobile terminals 20 to the base station 16, either directly or with the assistance of a relay station 22. The base station 16 may use channel quality indicators ("CQIs") associated with the mobile terminals 20 to schedule the data for transmission as well as select appropriate coding and modulation for transmitting the scheduled data. The CQIs may be directly from the mobile terminals 20 or determined at the base station 16 based on information provided by the mobile terminals 20. In either case, the CQI for each mobile terminal 20 is a function of the degree to which the channel amplitude (or response) varies across the OFDM frequency band.

Scheduled data 62, which is a stream of bits, is scrambled in a manner reducing the peak-to-average power ratio associated with the data using data scrambling logic 64. A cyclic redundancy check ("CRC") for the scrambled data is determined and appended to the scrambled data using CRC adding logic 66. Channel coding is performed using channel encoder logic 68 to effectively add redundancy to the data to facilitate recovery and error correction at the mobile terminal 20. Again, the channel coding for a particular mobile terminal 20 is based on the CQI. In some implementations, the channel encoder logic 68 uses known Turbo encoding techniques. The encoded data is processed by rate matching logic 70 to compensate for the data expansion associated with encoding.

Bit interleaver logic 72 systematically reorders the bits in the encoded data to minimize the loss of consecutive data bits. The resultant data bits are systematically mapped into corresponding symbols depending on the chosen baseband modulation by mapping logic 74. Preferably, Quadrature Amplitude Modulation ("QAM") or Quadrature Phase Shift Key ("QPSK") modulation is used. The degree of modulation is preferably chosen based on the CQI for the particular mobile terminal 20. The symbols may be systematically reordered to further bolster the immunity of the transmitted signal to periodic data loss caused by frequency selective fading using symbol interleaver logic 76.

At this point, groups of bits have been mapped into symbols representing locations in an amplitude and phase constellation. When spatial diversity is desired, blocks of symbols are then processed by space-time block code ("STC") encoder logic 78, which modifies the symbols in a fashion making the transmitted signals more resistant to interference and more readily decoded at a mobile terminal 20. The STC encoder logic 78 processes the incoming symbols and provide "n" outputs corresponding to the number of transmit antennas 34b for the base station 16. The control system 26 and/or baseband processor 28, as described above with respect to FIG. 2, provides a mapping control signal to control STC encoding. At this point, assume the symbols for the "n" outputs are representative of the data to be transmitted and capable of being recovered by the mobile terminal 20.

For the present example, assume the base station 16 has two transmit antennas 32b (n=2) and the STC encoder logic 78 provides two output streams of symbols. Accordingly, each of the symbol streams output by the STC encoder logic 78 is sent to a corresponding IFFT processor 80a, 80b (referred to collectively herein as IFFT 80), illustrated separately for ease of understanding. Those skilled in the art will recognize that one or more processors may be used to provide such digital signal processing, alone or in combination with other processing described herein. The IFFT processors 80 preferably operate on the respective symbols to provide an inverse Fourier Transform. The output of the IFFT processors 80 provides symbols in the time domain. The time domain symbols are grouped into frames, which are associated with a prefix-by-prefix insertion logic 82a, 82b (referred to collectively herein as prefix insertion 82). Each of the resultant signals is up-converted in the digital domain to an intermediate frequency and converted to an analog signal via the corresponding digital up-conversion ("DUC") and digital-to-analog ("D/A") conversion circuitry 84a, 84b (referred to collectively herein as DUC+D/A 84). The resultant (analog) signals are simultaneously modulated at the desired RF frequency, amplified, and transmitted via the RF circuitry 86a, 86b (referred to collectively herein as RF circuitry 86) and antennas 34b. Notably, pilot signals known by the intended mobile terminal 16 are scattered among the sub-carriers. The mobile terminal 16, which is discussed in detail below, uses the pilot signals for channel estimation.

Figure 6:
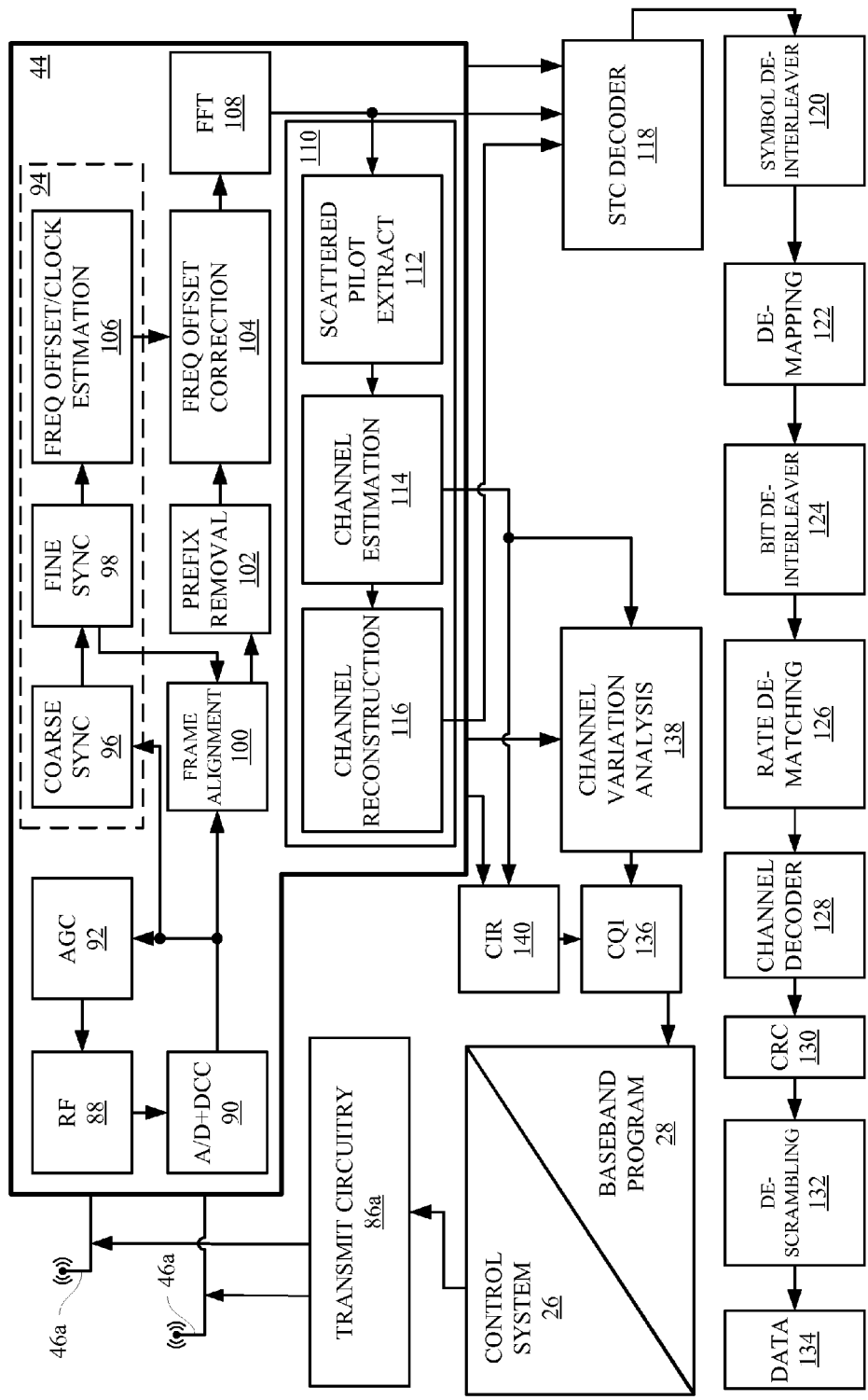
FIG. 6 is a block diagram of a logical breakdown of an exemplary OFDM receiver architecture constructed in accordance with the principles of the present invention.

Reference is now made to FIG. 6 to illustrate reception of the transmitted signals by a mobile terminal 20, either directly from base station 16 or with the assistance of relay 22. Upon arrival of the transmitted signals at each of the antennas 46a of the mobile terminal 20, the respective signals are demodulated and amplified by corresponding RF circuitry 88. For the sake of conciseness and clarity, only one of the two receive paths is described and illustrated in detail. Analog-to-digital (A/D) converter and down-conversion circuitry 90 digitizes and down-converts the analog signal for digital processing. The resultant digitized signal may be used by automatic gain control circuitry (AGC) 92 to control the gain of the amplifiers in the RF circuitry 88 based on the received signal level.

Initially, the digitized signal is provided to synchronization logic 94, which includes coarse synchronization logic 96, which buffers several OFDM symbols and calculates an auto-correlation between the two successive OFDM symbols. A resultant time index corresponding to the maximum of the correlation result determines a fine synchronization search window, which is used by fine synchronization logic 98 to determine a precise framing starting position based on the headers. The output of the fine synchronization logic 98 facilitates frame acquisition by frame alignment logic 100. Proper framing alignment is important so that subsequent FFT processing provides an accurate conversion from the time domain to the frequency domain. The fine synchronization algorithm is based on the correlation between the received pilot signals carried by the headers and a local copy of the known pilot data. Once frame alignment acquisition occurs, the prefix of the OFDM symbol is removed with prefix removal logic 102 and resultant samples are sent to frequency offset correction logic 104, which compensates for the system frequency offset caused by the unmatched local oscillators in the transmitter and the receiver. Preferably, the synchronization logic 94 includes frequency offset and clock estimation logic 106, which is based on the headers to help estimate such effects on the transmitted signal and provide those estimations to the correction logic 104 to properly process OFDM symbols.

At this point, the OFDM symbols in the time domain are ready for conversion to the frequency domain using FFT processing logic 108. The results are frequency domain symbols, which are sent to processing logic 110. The processing logic 110 extracts the scattered pilot signal using scattered pilot extraction logic 112, determines a channel estimate based on the extracted pilot signal using channel estimation logic 114, and provides channel responses for all sub-carriers using channel reconstruction logic 116. In order to determine a channel response for each of the sub-carriers, the pilot signal is essentially multiple pilot symbols that are scattered among the data symbols throughout the OFDM sub-carriers in a known pattern in both time and frequency.

Continuing with FIG. 6, the processing logic 110 compares the received pilot symbols with the pilot symbols that are expected in certain sub-carriers at certain times to determine a channel response for the sub-carriers in which pilot symbols were transmitted. The results are interpolated to estimate a channel response for most, if not all, of the remaining sub-carriers for which pilot symbols were not provided. The actual and interpolated channel responses are used to estimate an overall channel response, which includes the channel responses for most, if not all, of the sub-carriers in the OFDM channel.

The frequency domain symbols and channel reconstruction information, which are derived from the channel responses for each receive path are provided to an STC decoder 118, which provides STC decoding on both received paths to recover the transmitted symbols. The channel reconstruction information provides equalization information to the STC decoder 118 sufficient to remove the effects of the transmission channel when processing the respective frequency domain symbols.

The recovered symbols are placed back in order using symbol de-interleaver logic 120, which corresponds to the symbol interleaver logic 76 of the base station 16 transmitter. The de-interleaved symbols are then demodulated or de-mapped to a corresponding bitstream using de-mapping logic 122. The bits are then de-interleaved using bit de-interleaver logic 124, which corresponds to the bit interleaver logic 72 of the base station 16 transmitter architecture. The de-interleaved bits are then processed by rate de-matching logic 126 and presented to channel decoder logic 128 to recover the initially scrambled data and the CRC checksum. Accordingly, CRC logic 130 removes the CRC checksum, checks the scrambled data in traditional fashion, and provides it to the de-scrambling logic 132 for descrambling using the known base station descrambling code to recover the originally transmitted data 134.

In parallel to recovering the data 134, a CQI 136, or at least information sufficient to create a CQI at the base station 16, is determined by channel variation analysis logic 138 and transmitted to the base station 16. As noted above, the CQI 136 may be a function of the carrier-to-interference ratio ("CIR") 140, as well as the degree to which the channel response varies across the various sub-carriers in the OFDM frequency band. For this embodiment, the channel gain for each sub-carrier in the OFDM frequency band being used to transmit information is compared relative to one another to determine the degree to which the channel gain varies across the OFDM frequency band. Although numerous techniques are available to measure the degree of variation, one technique is to calculate the standard deviation of the channel gain for each sub-carrier throughout the OFDM frequency band being used to transmit data.

Figure 7:
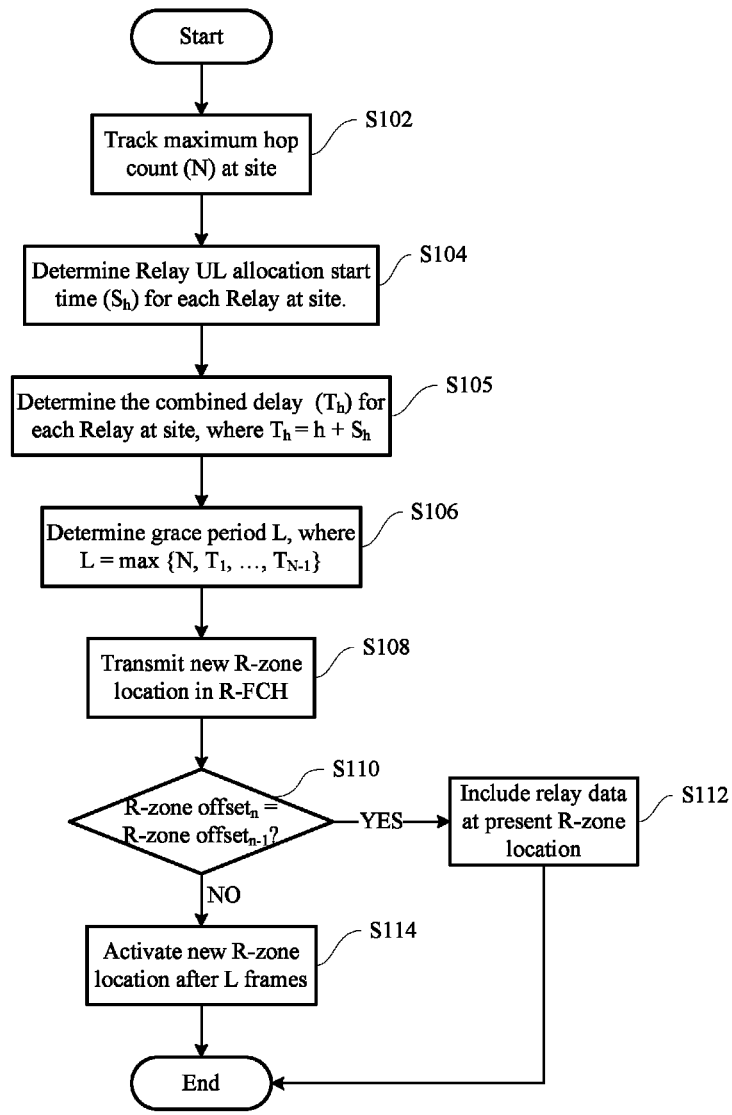
FIG. 7 is a flow chart of an exemplary dynamic relay zone change process implemented by a base station according to the principles of the present invention.

Referring now to FIG. 7, an exemplary operational flowchart is provided that describes steps performed by the base station 16 to dynamically change the R-zone location. The base station 16 tracks the maximum hop count local to its site (step S102). The maximum hop number among all MSs in the site may be denoted by "N". The maximum hop number is used to determine the maximum propagation delay of R-FCH from the base station 16 to the furthest access relay station 22, i.e. furthest active relay station 22 is reached in N−1 frames. In addition, the base station 16 determines the uplink ("UL") allocation time (measured in number of frames) in the R-MAP for each relay station 22 local to the base station 16 (step S104). The relay allocation start time for a relay station 22 located at hop number h is denoted as $S_h$. The relay allocation start time for each operational relay station 22 is provided in its R-link Channel Descriptor ("RCD") message. The total propagation delay of R-FCH for a specific relay station 22 is found by combining the hop number with the relay allocation start time (step S105), i.e., the combined delay is $T_h=h+S_h$. Therefore, the base station 16 determines a grace period, L, of at least $$L=\max\{N, T_1, \ldots, T_{N-1}\},$$

frames for any new frame configuration to take affect (step S106). The grace period ensures that any relay station 22 served by the base station 16 can successfully implement its resource allocation based on the previous configuration and update its resource allocation for the new frame configuration for the upcoming frames. The base station 16 transmits the R-zone location offset in the R-FCH (step S108). If the R-zone offset remains the same (step S110), i.e., R-zone offset$_n$=R-zone offset$_{n-1}$, the base station 16 continues to include relay data in subsequent frames at the present R-zone location (step S112). However, if the R-zone offset is changed (step S110), the new offset is effective at the frame where the Lth transmission of R-FCH takes place (step S114).

Figure 8:
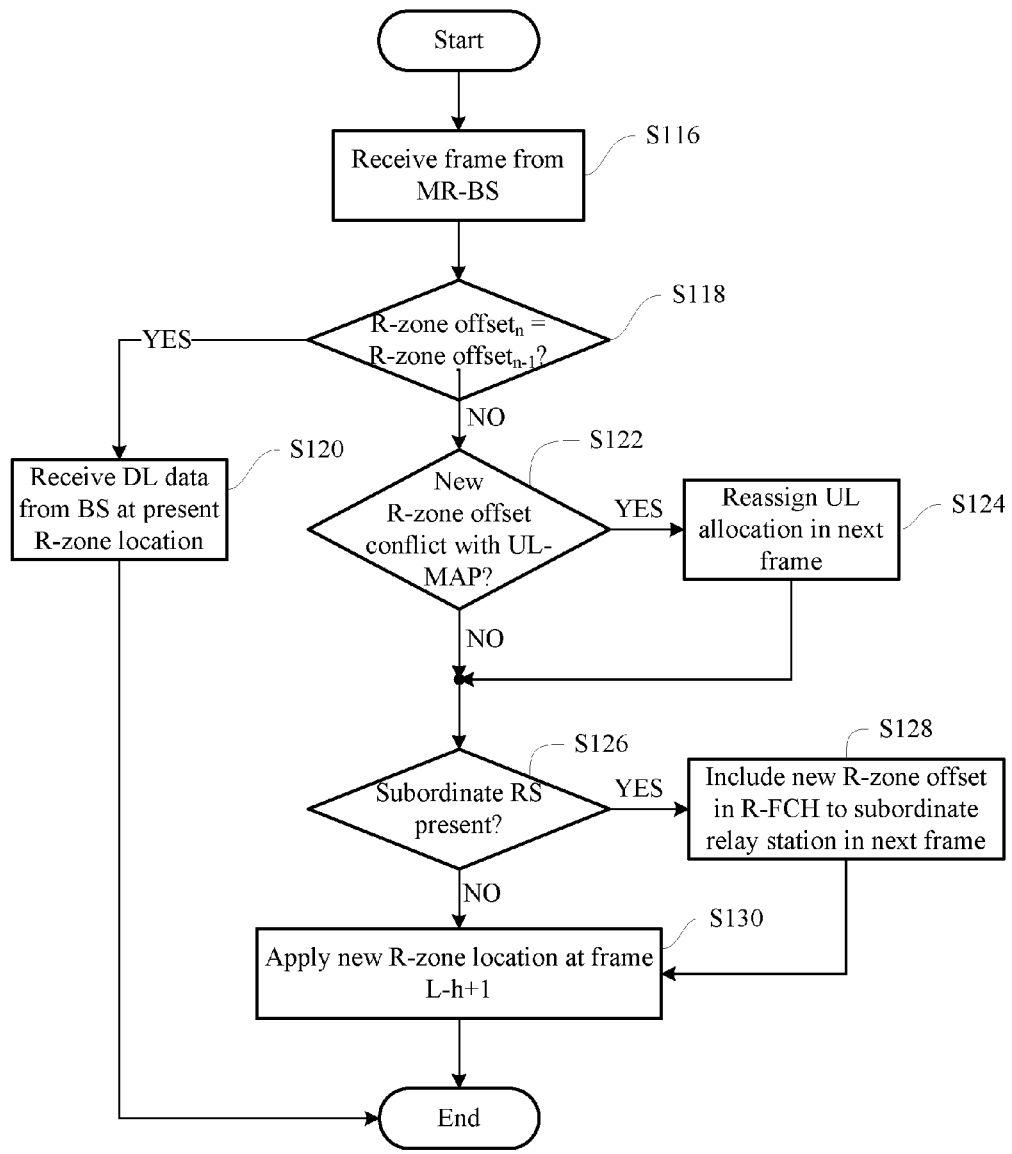
FIG. 8 is a flow chart of an exemplary dynamic relay zone change process implemented by a relay station according to the principles of the present invention.

Referring now to FIG. 8, an exemplary operational flowchart is provided that describes steps performed by the relay station 22 to dynamically change the R-zone location. The relay station 22 receives a frame from its superordinate station (the base station 16 or relay station 22) containing an R-zone offset in the R-FCH (step S116). If the R-zone offset remains the same (step S118), i.e., R-zone offset$_n$=R-zone offset$_{n-1}$, the relay station 16 continues to process allocation information and its resource allocations according to the previous frame configuration, i.e. continues to receive data from the base station 16 on the downlink ("DL") at the present R-zone offset location (step S120). However, if the R-zone offset is changed (step S118), the relay station 22 determines whether the new R-zone offset conflicts with the UL allocation time in the UL-MAP (step S122) and if so, updates its resource allocation for the new frame configuration and prepares for the switch over after the specific number of frames (step S124). If the relay station 22 also serves subordinate relay stations (step S126) the new R-zone offset information is included in its own R-FCH to the subordinate relay station 22 in the next frame (S128). The relay station 22 applies the new configuration after L−h+1 R-FCH transmissions (step S130) where h is the hop number for the relay station 22. It should be noted that L may be propagated down from the base station 16 through a new TLV of the RCD message. This is because a relay station 22 can transmit its updated R-FCH only after it receives the updated R-FCH from its superordinate station. Therefore, each hop adds one R-FCH transmission delay for the new R-FCH to arrive the next hop relay station 22.

For example, assume a 2-hop path, i.e. there is 1 relay station 22 between the base station 16 and the mobile station 20. In this case, N=2 and the grace period L=max {2, 1+Relay UL allocation start time}. If the Relay UL allocation start time is 2 frames, then L=max {2, 1+2}=3. When the base station 16 sends a zone configuration change in its R-FCH message in the i-th frame, the R-zone change becomes effective from frame i+3. For the first hop relay station 22, i.e. h=1; L−h+1=3−1+1=3, so the R-FCH change is effective from frame i+3 matching the base station 16. Extending this to a 3-hop path with the Relay UL allocation start time for the first hop and the second hop relay stations 22 being 2 frames and 1 frame respectively, then L=max {3, 1+2, 2+1}=3. Base station 16 switches over at frame i+3. The first hop relay station 22 switches over at L−h+1=3−1+1=3 frames after frame i which is frame i+3. The second hop relay station 22 switches over at L−h+1=3−2+1=2 frames after frame i+1 as it received the zone configuration change in R-FCH in the (i+1)th frame. Therefore, all the relay stations 22 and the base station 16 switch over in the same frame, i.e. i+3, taking into account the UL resource allocation delay of the relay stations 22.

It should be noted that if the system 10 can tolerate independent zoning from branch to branch, the process may be implemented only for a single branch taking N as the maximum hop count in that branch.

In some systems, Zone Configuration Information Element ("IE") may be provided in the Frame Configuration Type-Length-Value ("TLV") of an RCD message to provide the zone configuration parameters, e.g., permutation type and parameter, AMC mode, STC zone mode, etc. In this case, in order to follow R-FCH for R-link synchronization and track frame zone configuration dynamically, the STC/DL zone switch IE should indicate the zone information to the relay station 22. When the R-zone location changes, it is likely that the zone parameters will change as well, and to indicate this change, the STC zone switch IE should be included in the R-MAP because it may be too late to change the zone parameters if they are received via a MAC message.

The DL MAP IEs in R-MAP refer to allocations within the current frame, while UL MAP IEs in R-MAP at frame i refer allocations to frame i+Relay UL allocation start time, where Relay UL allocation start time ≧0. Therefore, in case of an update in R-Zone Location, e.g., a frame configuration change, the relay station 22 should be aware of the new relay zone sizes in a dynamic manner so that its resource allocations do not conflict. For this purpose, the base station 16 or relay station 22 may need to insert an R-link specific IE to provide the updated relay zone information in advance before the frame that the configuration update indicated by the R-FCH arrives. Although this may not be needed for R-UL MAP allocations when the Relay UL allocation start time >0, in general, it is useful for R-DL MAP allocations since DL MAP IEs in R-MAP always refer to the frame in which the R-MAP is received. The subordinate relay stations 22 would not be aware of zone switch IEs if the relay station 22 solely relies on the STC/DL zone switch IEs transmitted in the R-MAP.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for dynamically changing a relay zone offset in a wireless communication system, the wireless communication system including a base station, at least one relay station, and at least one mobile station, each relay station located a hop distance from the base station, the method comprising:
    tracking a maximum amount of hops from the base station to the at least one mobile station;
    transmitting a notification of a change in relay zone offset to a relay station;
    delaying implementation of the change in relay zone offset for a predetermined amount of frames, the predetermined amount of frames based at least in part on the maximum amount of hops; and
    transmitting relay zone information using the changed relay zone offset.

2. The method of claim 1, wherein the predetermined amount of frames is based on a maximum of the maximum amount of hops from the base station to the at least one mobile station and the hop distance of each relay station plus an uplink allocation start time of each relay station.

3. The method of claim 2, wherein the uplink allocation start time is received from each relay station as a Type-Length-Value ("TLV") in a Relay-Uplink ("R-UL") MAC message.

4. The method of claim 2, wherein the uplink allocation start time is determined by the base station and transmitted to the at least one relay station as a Type-Length-Value ("TLV") in a Relay-Link Channel Description ("RCD") message.

5. The method of claim 1, wherein the notification of a change in relay zone offset is transmitted by providing a new relay zone offset value in a relay frame control header ("R-FCH").

6. A method for dynamically changing a relay zone offset in a wireless communication system, the wireless communication system including a base station, at least one relay station, and at least one mobile station, each relay station located a hop distance from the base station, the method comprising:
    tracking a maximum amount of hops from the base station to the at least one mobile station;
    receiving a frame including a first relay zone offset;
    determining the first relay zone offset is different from a second relay zone offset, the second relay zone offset having been received in a previous frame;
    delaying implementation of the first relay zone offset for a predetermined amount of frames, the predetermined amount of frames based at least in part on the maximum amount of hops; and
    receiving downlink information using the first relay zone offset.

7. The method of claim 6, further comprising:
    determining that the first relay zone offset conflicts with an uplink resource allocation; and
    reallocating the uplink resource after a predetermined amount of frames.

8. The method of claim 6, further comprising:
    determining that a subordinate relay station is present; and
    transmitting the first relay zone offset to the subordinate relay station in a next subsequent frame.

9. The method of claim 8, wherein the first relay zone offset is transmitted to the subordinate relay station in a relay frame control header ("R-FCH").

10. The method of claim 6, wherein the predetermined amount of frames is based on a maximum of a maximum amount of hops from the base station to the at least one mobile station and the hop distance of each relay station plus an uplink allocation start time of each relay station.

11. The method of claim 10, wherein the predetermined amount of frames is one more than the maximum of the maximum amount of hops from the base station to the at least one mobile station and the hop distance of each relay station plus the uplink allocation start time of each relay station less the hop distance of the relay station.

12. A wireless communication system for communication with at least one mobile station, the wireless communication system comprising:
    at least one relay station; and
    at least one base station in communication with the at least one mobile station through the at least one relay station, the at least one relay station located a hop distance from the base station, the base station configured to:
        track a maximum amount of hops from the base station to the at least one mobile station;
        transmit a notification of a change in relay zone offset to the at least one relay station;

delay implementation of the change in relay zone offset for a first predetermined amount of frames, the first predetermined amount of frames based at least in part on the maximum amount of hops; and transmit relay zone information using the changed relay zone offset.

13. The communication system of claim 12, wherein the first predetermined amount of frames is based on a maximum of the maximum amount of hops from the base station to the at least one mobile station and an uplink allocation start time of each relay station.

14. The communication system of claim 12, wherein the notification of a change in relay zone offset is transmitted by providing a first relay zone offset value in a relay frame control header ("R-FCH").

15. The communication system of claim 12, wherein the relay station is configured to:

receive a frame including a first relay zone offset;

determine the first relay zone offset is different from a second relay zone offset, the second relay zone offset having been received in a previous frame;

delay implementation of the first relay zone offset for a second predetermined amount of frames; and receive downlink information using the first relay zone offset.

16. The communication system of claim 15, wherein the relay station is configured to:

determine that the first relay zone offset conflicts with an uplink resource allocation; and reallocate the uplink resource after a predetermined amount of frames.

17. The communication system of claim 15, wherein the relay station is configured to:

determine that a subordinate relay station is present; and transmit the first relay zone offset to the subordinate relay station in a next subsequent frame.

18. The communication system of claim 15, wherein the second predetermined amount of frames is one more than the maximum of the maximum amount of hops from the base station to the at least one mobile station and the hop distance of each relay station plus the uplink allocation start time of each relay station less the hop distance of the relay station.

* * * * *